United States Patent
Lieb

(10) Patent No.: US 7,213,363 B2
(45) Date of Patent: *May 8, 2007

(54) PLANING FLOAT WITH LATERAL MOTION CONTROL

(75) Inventor: Paul J. Lieb, 3586 Wadsworth Rd., Norton, OH (US) 44203

(73) Assignee: Paul J. Lieb, Norton, OH (US)

( * ) Notice: Subject to any disclaimer, the term of this patent is extended or adjusted under 35 U.S.C. 154(b) by 23 days.

This patent is subject to a terminal disclaimer.

(21) Appl. No.: 10/907,532

(22) Filed: Apr. 5, 2005

(65) Prior Publication Data

US 2005/0172539 A1 Aug. 11, 2005

Related U.S. Application Data

(63) Continuation-in-part of application No. 10/438,688, filed on May 15, 2003, now Pat. No. 6,874,271.

(51) Int. Cl.
*A01K 91/08* (2006.01)
(52) U.S. Cl. ...................................... 43/43.13
(58) Field of Classification Search .............. 43/43.13, 43/44.87, 44.9
See application file for complete search history.

(56) References Cited

U.S. PATENT DOCUMENTS

| 2,566,612 | A | | 9/1951 | Hearne |
| 2,591,558 | A | | 4/1952 | Kramer |
| 2,931,124 | A | | 4/1960 | Johnston |
| 3,003,277 | A | | 10/1961 | Vann |
| 3,401,483 | A | * | 9/1968 | Bellah et al. ............... 43/42.39 |
| 3,453,768 | A | * | 7/1969 | Feaster et al. ............. 43/42.06 |
| 3,524,277 | A | | 8/1970 | Neubert |
| 3,831,308 | A | * | 8/1974 | Shaw ......................... 43/43.13 |
| 3,872,617 | A | * | 3/1975 | Zalonis ...................... 43/43.13 |
| 4,028,839 | A | * | 6/1977 | Stubblefield ................ 43/43.13 |
| 4,461,115 | A | | 7/1984 | Carrillo |
| 4,464,858 | A | | 8/1984 | Wright |

(Continued)

FOREIGN PATENT DOCUMENTS

GB 2-355-962 A 5/2001

OTHER PUBLICATIONS

The Cutting Edge, Editor's Choice: New Products, Cuted: your guide to the latest in outdoor products, website http://ww2.basspro.com/media/outdoormag/novdec97/cuted.htm (Apr. 6, 2005).

*Primary Examiner*—Teri Pham Luu
*Assistant Examiner*—Susan C. Alimenti
(74) *Attorney, Agent, or Firm*—Hahn Loeser & Parks LLP

(57) ABSTRACT

A float device which provides an on-demand change in tacking or planing direction without having to retrieve the float or adjust the float configuration. The float utilizes a float body and at least two longitudinal keel members oppositely disposed on the float body. In a first orientation, the first keel is submerged and the second keel is in the air and the float tacks in the first keel direction. A sharp pull on a tether line connected to the float causes the float body to roll 180 degrees such that second keel is submerged and the first keel is in the air and the float tacks in the second keel direction.

14 Claims, 3 Drawing Sheets

U.S. PATENT DOCUMENTS

| | | | |
|---|---|---|---|
| 4,567,687 A * | 2/1986 | Even et al. ................. 43/43.13 |
| 5,033,226 A * | 7/1991 | Jackson ..................... 43/43.12 |
| 5,165,196 A | 11/1992 | Spickelmire |
| 5,243,780 A | 9/1993 | Christensen |
| 5,276,994 A * | 1/1994 | Thompson et al. ........ 43/43.13 |
| 5,404,668 A | 4/1995 | Christensen |
| 5,636,467 A | 6/1997 | Adams |
| 5,732,502 A | 3/1998 | Hansen |
| 6,430,867 B1 | 8/2002 | Johnston et al. |
| 6,874,271 B2 | 4/2005 | Lieb |

* cited by examiner

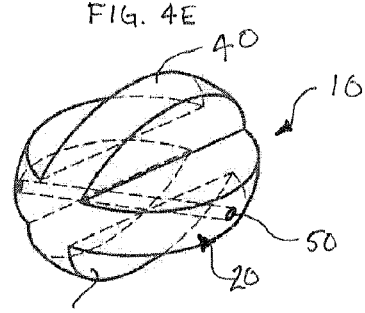
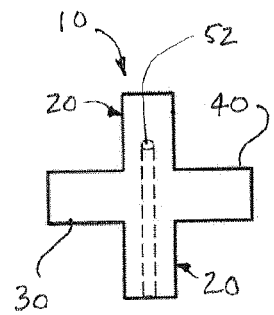
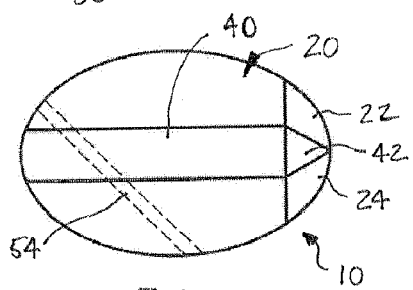
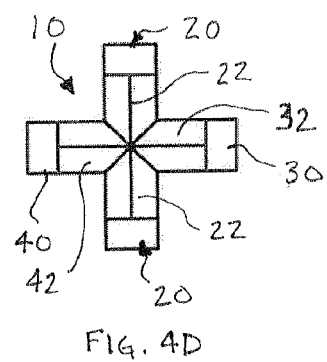
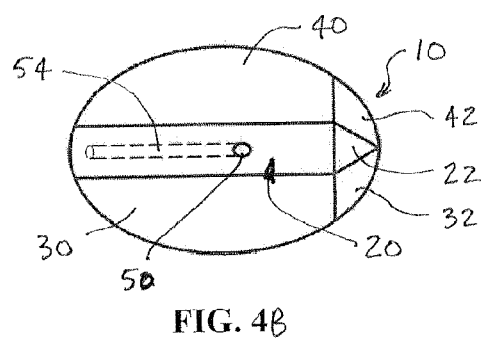
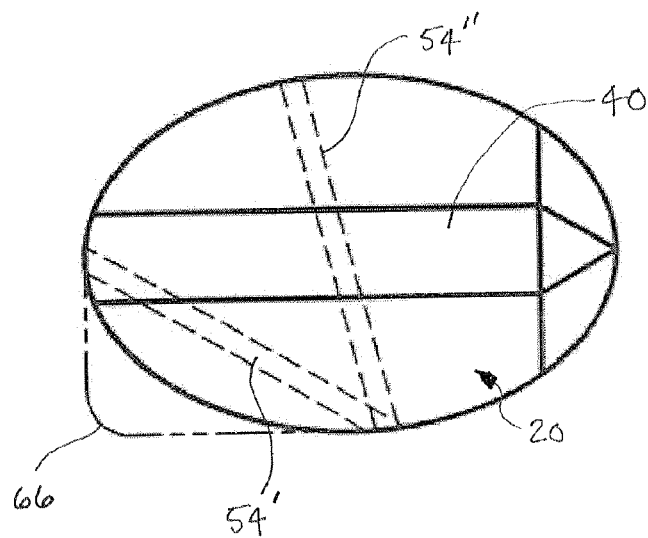
FIG. 5

PLANING FLOAT WITH LATERAL MOTION CONTROL

This application is a continuation-in-part of U.S. Nonprovisional patent application Ser. No. 10/438,688, filed May 15, 2003, now U.S. Pat. No. 6,874,271 which is hereby incorporated by reference.

FIELD OF THE INVENTION

The invention relates to buoyant devices and, more particularly, to a tacking or planing float having lateral motion control in that the planing direction of the float can be changed during use without the need to retrieve and/or adjust the float device.

BACKGROUND OF THE INVENTION

When a tethered float is used in a situation with relative movement between the water and the user, it is difficult to control the position of the float. For example, a fisherman fishing in a river, using a lure attached to a float, will find that the float is carried by the current toward the bank of the river where it may become entangled in the overgrowth of the bank or in weeds in the shallow water. A fisherman on a moving boat will find that the float is carried to the rear of the boat and into the turbulent water area aft of the boat engine.

Several attempts have been made to overcome this problem by providing a guidable float. One such device utilizes a body having two keels, each keel extending orthogonally from opposite sides of the float body, wherein the keels are fixed and perpendicular with relation to each other. The problem with this and other such prior art devices is that they are designed to plane in a single lateral direction. This can be a particular problem in a situation where the fishermen is fishing off both sides of the boat or is fishing off both sides of a river.

One more versatile prior art float design is adjustable and allows planing in two directions, however, in order to change the planing direction of the float, it is necessary to remove the float from the water and change the position of the keels by repositioning a spring detent which limits movement of the keels to a position 90 degrees from its original position on the body.

Therefore, there remains a need in the art for a float device which provides planing in two different directions, without having to retrieve the float and adjust the float configuration in an opposite planing direction.

SUMMARY OF THE INVENTION

It is an object of the present invention to provide an improved float device which provides an on demand change in planning direction without having to retrieve the float or adjust the float configuration. These and other advantages of the present invention are provided by a float for use in fluid and tethered to a line, the float comprising: A tethered float for use in a fluid comprising: a float body comprising a first keel and a second keel each having a first end and a second end, wherein the first and second keels are positioned on the float body such that one of the first keel and the second keel is submerged in the fluid and the other of the first keel and the second keel is above the surface of the fluid when the float is placed in the fluid; a tether attached to the float body at a location offset from a plane through either the first and the second keel members, the location also being between the first and second ends of the first and second keel members such that the float body moves in a direction transverse to the tether line when the float is pulled through the water and such that a quick pull on the tether line causes the float body to flip in the fluid thereby reversing the positions of the keels in regards to the fluid and thereby changing the transverse movement direction of the float when the float is pulled through the fluid.

With the above, and other objects in view that will hereinafter appear, the nature of the invention will be more clearly understood by reference to the following detailed description and the several views illustrated in the accompanying drawings.

BRIEF DESCRIPTION OF THE DRAWINGS

Better understanding of the present invention will be had when reference is made to the accompanying drawings, wherein identical parts are identified with identical reference numerals, and wherein:

FIGS. 4A–4E are multiple views of the float of FIG. 1, wherein FIG. 4A is a top plan view, FIG. 4B is a side view, FIG. 4C is a first end view, FIG. 4D is a second end view, and FIG. 4E is a perspective view; and FIG. 5 shows a top plan view of a second embodiment of the float device of the present invention showing alternate hole and attachment configurations for a tether line shown in phantom.

DETAILED DESCRIPTION OF THE DRAWINGS

Figure 1:
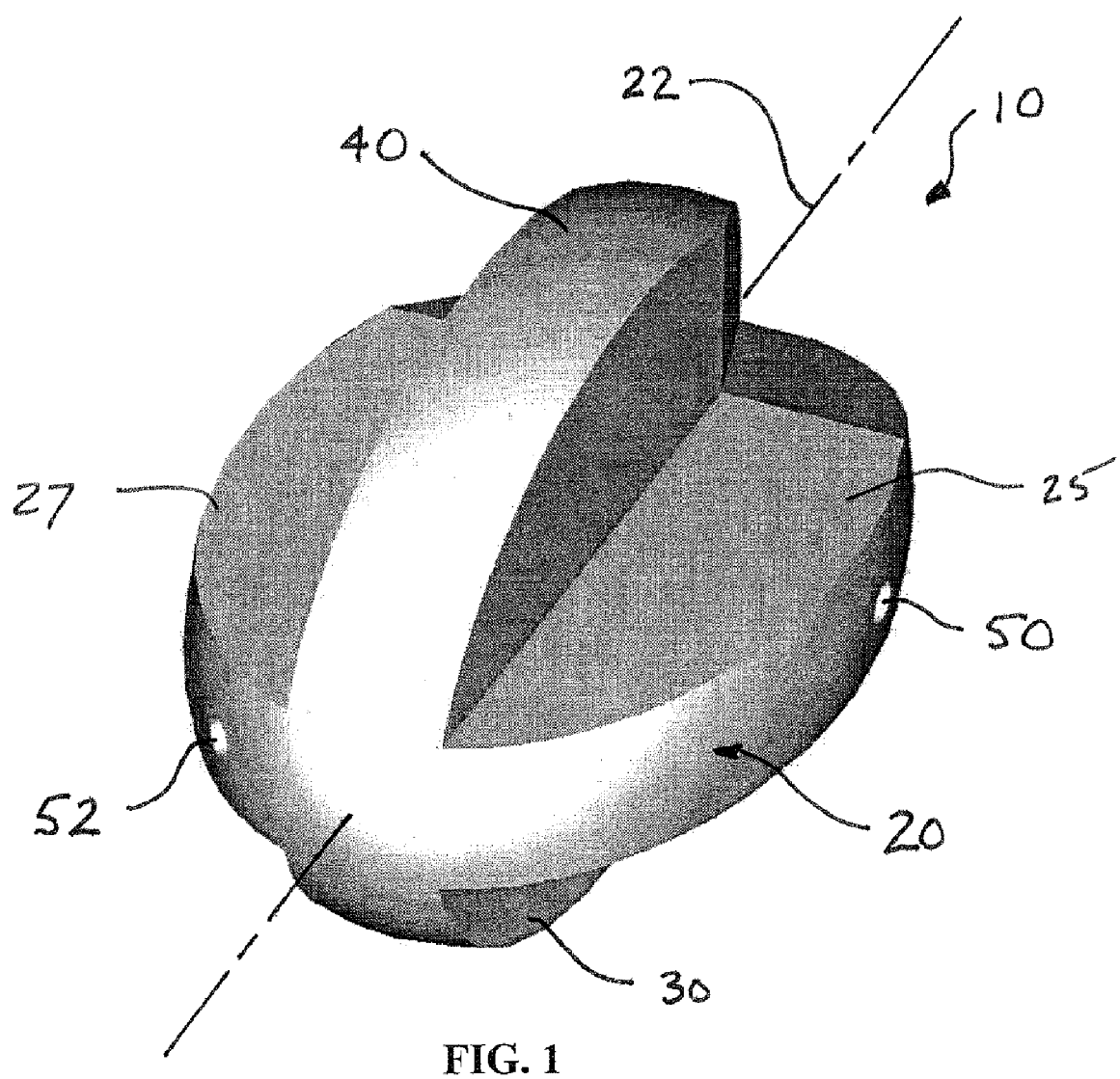
FIG. 1 shows a perspective view of an embodiment of the float of the present invention.

Reference is first made to FIG. 1 of the drawings which shows an embodiment of a float of the present invention generally designated as element 10. Float 10 comprises a float body 20 having a longitudinal axis 22, a first longitudinal keel member 30 extending radially from the float body 20 and a second longitudinal keel member 40 extending in an opposite radial direction with respect to the first keel member 30 from the float body 20. Float body 20 further comprises wing members 25, 27 shown extending transverse to the keel members 30, 40 on opposite sides of the float. The float 10 is longitudinally bi-symmetric about a plane through the float body 20. In the embodiment shown in FIG. 1, the keel members 30, 40 are shown positioned orthogonal to the wing members 25, 27 of the float body 20 in a coplanar relationship, however the invention is not intended to be limited to such a configuration. Float 10 further comprises a means 50, 52 for attaching a tether line 60 (see FIG. 2) to the float body 20 at a predetermined location such as the wing members 25, 27. The attachment location is offset from a plane through the keel members 30,40 and longitudinally between the ends of the keel members 30, 40. It is noted that the float body is not intended to be limited to the embodiment shown in FIG. 1 and that it is contemplated that innumerable variations are possible without departing from the scope of the invention.

Figure 2:
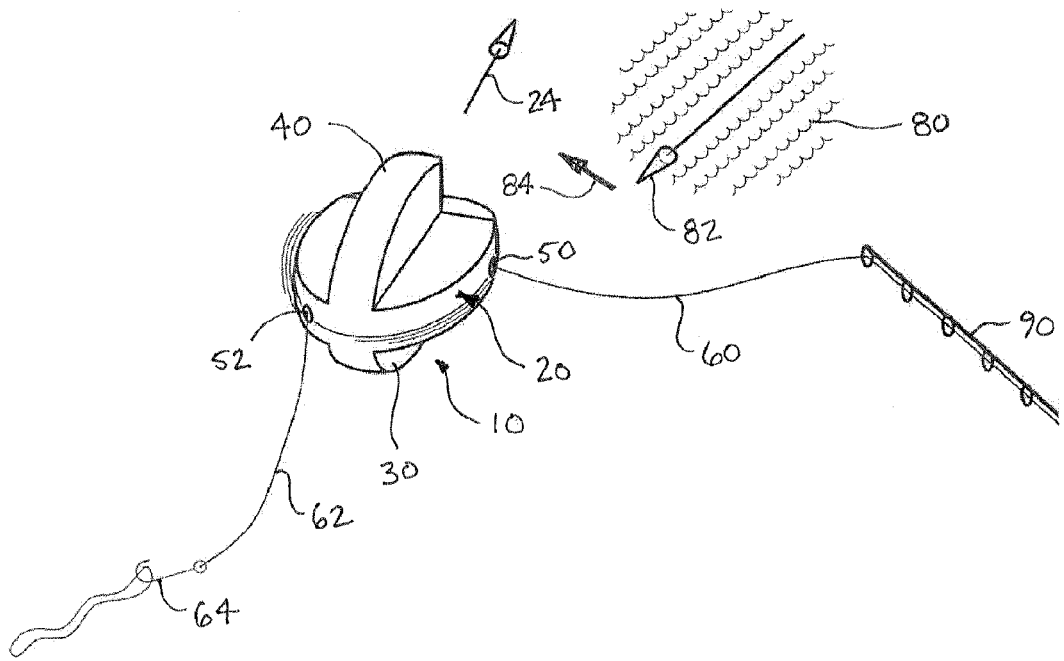
FIG. 2 shows a perspective view of the float of FIG. 1 in use with a fishing line in a body of moving water.

Referring now to FIG. 2, the float 10 is shown in a fishing application in a body of moving water such as a river. The float body 20 is designed and constructed to be partially submerged in a fluid 80 such as water. Tether line 60 in the form of a fishing line is attached on one end to a float body by means 50 for attaching and on the other end to a reel/fishing pole 90. A hook line 62 extends from the means 52 for attaching and includes a lure 64 in the form of a baited hook at an end thereof. In an alternate embodiment, not shown, the hook is attached directly to the float as a lure. The means 50, 52 for attaching a tether line 60 (or hook line 62) may be an eyelet wherein each line 60, 62 is separate and attached to each eyelet. In addition, it is also contemplated that any of a number of known mechanisms may be used to connect a line 60 to the float 10 without breaking the line 60. Means 50, 52 may comprise apertures having a through hole 54 therebetween (see FIG. 3). Through hole 54 provides easy adjustability without breaking the line 60. A mechanism such as a cylindrical wedge or plug (not shown) can be placed in the hole 54 to hold the line 60 in place or an obstruction, such as split shot (not shown), can be placed on the line 60 to set the distance from the float 10 to the hook 64. It is also contemplated that a tube (not shown) or sleeve could be incorporated in the through hole 54 and secured therein by an interference fit. The tube sleeve could be extended from the hole 54 to allow adjustment of work points for improved planing or rolling performance as will be described in greater detail below with regard to operation of float 10.

The operation of float 10 is shown first with reference to FIG. 2. The float 10 is cast in the water 80 flowing at a velocity 82 using fishing pole 90 such that the float body 20 is partially submerged in the water 80 and wherein the first keel member 30 is submerged in the water and the opposite keel member 40 is oriented upward out of the water 80. The keels are positioned longitudinally along their longitudinal axis in a direction shown by arrow 22. In the configuration shown, the flowing stream 82 will cause the fishing line 60 to grow taut and the flowing stream will react against the first keel 30 in such a manner that the vector of the resulting forces will be against the line 60 and in the direction of the arrow 84. As long as the stream is flowing, the water will create a force against the first keel 30 and, as long as the fisherman maintains the line 60 in a given position, the float 10 will maintain its position regardless of the action of the flowing water 82.

Figure 3:
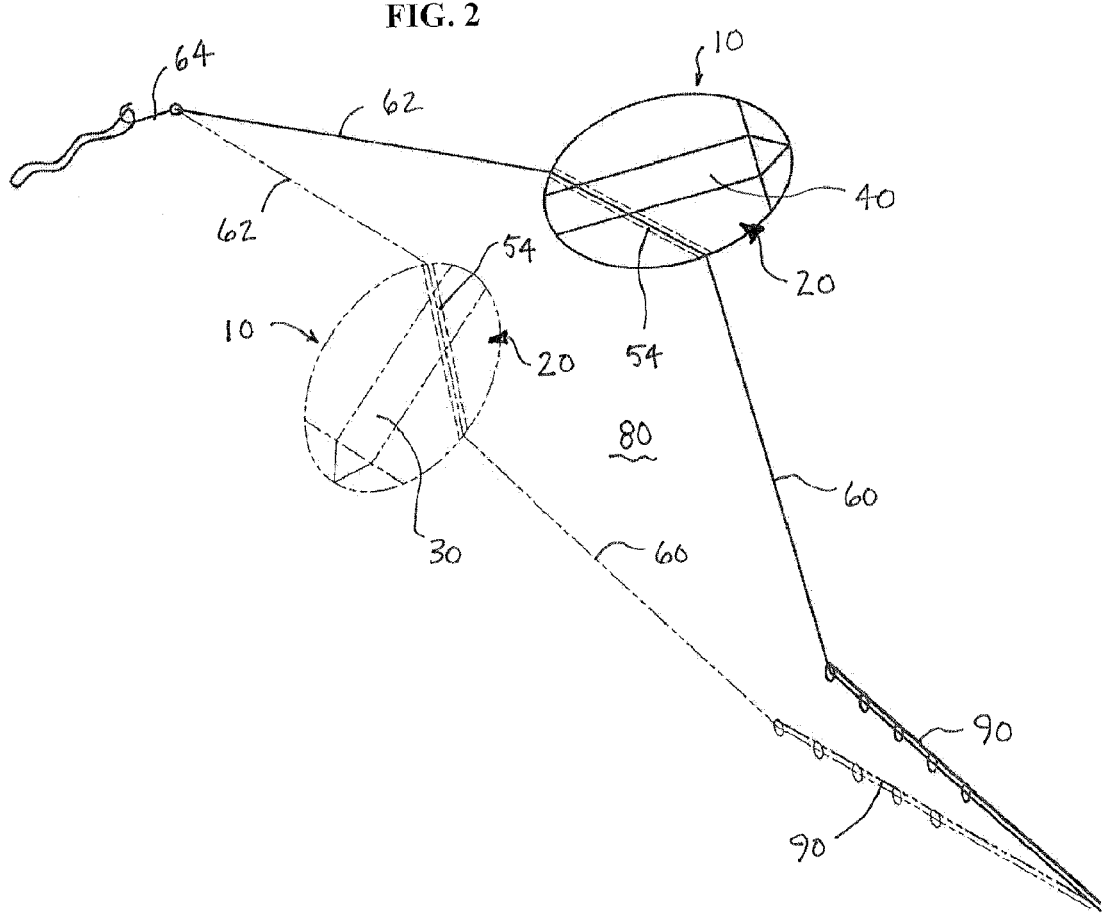
FIG. 3 shows a plan view of the float of FIG. 1 in a first position and a second position, wherein the second position is achieved by movement of the tether line.

A novel feature of the present invention is best shown in FIG. 3. A review of the geometry of float 10 will show that the float 10 will assume either a first or second position in the water 80 and that each position will produce a different result. In a first position, as shown by the solid lines, the current forces will keep the float 10 in a stationary position as discussed with relation to FIG. 2. The solid lines of FIG. 3 represent a plan view of the stationary float position shown in FIG. 2.

The user of the present invention can change the orientation of the float 10 by causing a sudden tension on the tether line 60. The sudden tensile force is resisted more by the immersed keel than the keel in the air. The difference in the resistance of the fluid verses the gas (air) also causes the portion of the body on the side of the tether line to submerge and initiate a rolling reaction. The reaction caused by the force on the tether line 60 causes the float 10 to roll over, and the keel members 30, 40 can change their orientation with respect to the surface of the water 80 such that the previously submerged keel member becomes above water and the previously out of water keel member becomes submerged as shown by the float 10 in the dashed lines. The float 10 will now move in a direction in the vector of the resulting forces of the water and the longitudinal orientation of the keel. The float's unique design incorporates balance, shape, and buoyancy to allow it to easily roll over, stabilize, and reverse its lateral direction of motion upon demand by the user.

The float 10 of the present invention can also be used in stationary fluid such as a pond. Upon retrieval of the float 10, by flipping the float 10 between positions, the float 10 can produce a retrieval in a zigzag pattern of desired lengths that can produce different directions of attack that may be more successful in attracting a fish.

The various views of the float 10 are shown in FIGS. 4A–4E. The float can be a single piece molded body, i.e. foam injection, or a two-piece interlocking body, i.e. die cut. The interior of the float 10 can be hollow to provide a location for ballast to adjust balance and/or buoyancy of the float 10. The top and bottom fins or keels 30, 40 are used to cut through the water and would typically be of identical shape and size. Weights (not shown) may be utilized at the ends of the keels to assist in stability and rollover of the float. Tapered ends 32, 42 may be provided on one or more ends of the keels, 30, 40. It is also contemplated that one or more of the surfaces on one or more of the fins, or the fin itself, can have an axial curve or curves to provide a vertical and/or horizontal vibrating action when cutting through water 80. Tapered ends 22, 24 may be provided on one or more ends of the float body 20. The float body 20 is shown as an oval shape, however, it is not intended to be limited as such. The float body 20 can be of any shape or size that provides balance, stability, and assists in rollover of the float 10.

Referring now to FIG. 5, alternate embodiments of the float 10' are shown having a through hole 54' and a through hole 54" representing different attachment locations for the tether line (not shown). The attachment of the tether line 60 must be in a location such that a sudden tug on the tether line will initiate rollover of the float 10'. The tether line is not required to go through the float body 20. A portion 66 of the tether line can be attached along the periphery of the body 20 as shown in FIG. 5.

The float 10 may also be used as a rescue device. The float of the present invention, made of an appropriate size and materials, could eliminate the rescuer's need to be accurate with the throw and eliminate the possibility of having to retrieve and throw again by being a controllable float that can stretch out a line in front of the path of the person in need of rescue. As a life-saving rescue buoy, the float may be configured to contain rescue signaling devices. It is also contemplated that the float can have any other attachments supplemental to rescue.

It is contemplated that additional variations of the present invention are possible. For example, known release mechanisms used on diving and floating trolling devices that allow the body to slide down the line when retrieving a fish and provide complete roll-up of the line could be incorporated in the present invention. Known release mechanisms used on diving and floating trolling devices designed to relieve the float's resistance when retrieving a fish could be incorporated in the present invention. Known electric lights, glow paint, or glow sticks can be added to the present invention for night fishing or night rescue. Known mechanical or electric sound producers can be inserted or attached to the float of the present invention. Pin or paddle wheels can be attached to attract fish.

A shifting ballast could be added internally or externally to provide mechanical advantage for control of the float of the present invention. A cam on a spindle could be used to control line slippage through the hole under some of the float's steady states. These and other variations may be added to the float of present invention without altering the scope of the invention.

Although the present invention has been described above in detail, the same is by way of illustration and example only and is not to be taken as a limitation on the present invention.

What is claimed is:

1. A tethered float for use in a fluid comprising: a float body comprising
    a first keel and a second keel each having a first end and a second end, wherein the first and second keels are positioned on the float body such that one of the first keel and the second keel is submerged in the fluid and the other of the first keel and the second keel is above the surface of the fluid when the float is placed in the fluid;
    a tether attached to the float body at a location offset from a plane through either the first and the second keel members, the location also being between the first and second ends of the first and second keel members such that the float body moves in a direction transverse to the tether line when the float is pulled through the water and such that a quick pull on the tether line causes the float body to flip in the fluid thereby reversing the positions of the keels in regards to the fluid and thereby changing the transverse movement direction of the float when the float is pulled through the fluid.

2. The float of claim 1 further comprising a means for attaching a towed line.

3. The float of claim 2 further comprising a hook or lure attached to the towed line.

4. The float of claim 1 further comprising a means for directly attaching at least one of the objects in the group consisting of hooks, lights, glow sticks, spinners, pinwheels, artificial fins, fishing nets, tools, flairs, soft body tails, and chemical fish attractants.

5. The float of claim 1 wherein the float body further comprising an appearance of a lure.

6. The float of claim 1 further comprising an attachment for attracting fish.

7. The float of claim 1 wherein the tether line attached to the float body also extends from the float body to form a towline.

8. The float of claim 1 further comprising at least one wing formed transverse to the first and second keel members and generally parallel to the surface of the fluid when the float is positioned in the fluid.

9. The float of claim 8, wherein the float comprises at least two wing members formed in a single plane and extending outward from opposite sides of the float.

10. The float of claim 9, wherein the first and second keel members are formed in a single plane and extend outward from opposite sides of the float and wherein the first and second keel members are perpendicular to the at least two wing members.

11. The float of claim 8, further comprising a means of reducing the horizontal stability of the float to enable the wing to dive downward into the fluid when the fluid surface is turbulent or turbulence is created by user tension.

12. The float of claim 11, wherein the means of reducing the stability of the float is accomplished by adjusting the buoyancy, weight distribution, the length to width ratio or other geometry of the float.

13. A method for changing the tack direction of a float, the method comprising the steps of: providing a float comprising a float body constructed to be partially submerged in the fluid, a first keel member, a second keel member; and a tether line attached to the float body wherein the attachment of the tether line is offset from a plane through the keel members; placing the float in a fluid such that the first keel member is submerged in the fluid and the second keel member is out of the fluid; pulling the float through the fluid with the tether line such that the float moves in a first direction transverse to the tether line; and applying a sharp tensile force to the tether line such that the resistance of the fluid against the first keel member causes the float to switch keels such that the second keel member is submerged in the fluid and the first keel member is out of the fluid; pulling the float through the fluid with the tether line such that the float moves in a second direction, different from the first direction, and transverse to the tether line.

14. The method of claim 13 wherein the step of pulling the float through the fluid is accomplished by fluid currents, fluid tides, wind or pulling on the tether line.

* * * * *